United States Patent [19]

Woodall et al.

[11] 3,717,295
[45] Feb. 20, 1973

[54] FRICTION WELDING OR LIKE MACHINES

[75] Inventors: Alan Woodall, Wolverhampton; Chesleigh Brian Honey, Walsall, both of England

[73] Assignee: Clarke Chapman-John Thompson Limited, Victoria Works, Gateshead on Tyne, County Durham, England

[22] Filed: March 17, 1971

[21] Appl. No.: 125,182

[52] U.S. Cl. .....................228/2, 29/470.3, 100/214
[51] Int. Cl. ..............................................B23k 27/00
[58] Field of Search ....29/470.3; 228/2; 72/407, 455; 100/214; 156/73

[56] References Cited

UNITED STATES PATENTS

| | | | |
|---|---|---|---|
| 1,580,894 | 4/1926 | Hummel | 100/214 |
| 3,388,849 | 6/1968 | Blum et al. | 228/2 |
| 3,435,510 | 4/1969 | Oberle et al. | 29/470.3 |
| 3,559,443 | 2/1971 | Petsch | 100/214 |

Primary Examiner—J. Spencer Overholser
Assistant Examiner—R. J. Craig
Attorney—Merriam, Marshall, Shapiro & Klose

[57] ABSTRACT

The disclosure relates to friction welding and other machines having holders for parts which are to be brought into contact and urged together by forces acting along an axis which extends through the contacting faces, the holders being supported by a bed which is off-set from the axis. The disclosure provides a machine having an end-loaded member distinct from the bed which bears the b ending load resulting from the contact pressure between the held parts and which is so arranged that it does not transmit to the bed any significant bending load such as would create misalignment of the holders and parts held thereby. The bed may be an open-ended box section member on an upper face of which the holders are mounted, the end-loaded member being a beam which extends through the interior of the bed, and the reaction to the force which urges the held parts together being transmitted to the beam by parts which extend from end portions of the beam upwardly to the axis.

10 Claims, 5 Drawing Figures

FRICTION WELDING OR LIKE MACHINES

BACKGROUND TO THE INVENTION

This invention relates to machines (hereinafter referred to as being of the kind specified) comprising respective holder means for supporting parts which in the course of operation of the machine are required to be brought into contact with each other under pressure exerted along a reference axis passing through their contacting faces, pressure-applying means for urging at least one of the holder means along said axis to establish said contact under pressure between said faces, and a body structure for supporting the holder means including a bed which is off-set radially with respect to said axis and which serves to locate said holder means to maintain proper alignment of said parts with each other along said axis. The term "bed" is used herein for convenience to denote any form of supporting member on which said holder means may be mounted and which is formed or constructed to permit of the required movement of at least one of the holder means, for example by the provision of one or more slideways on the bed. In many cases, the bed will be horizontal, but it would be within the scope of the invention for the bed to be disposed in some other attitude, for example vertical or at an inclination to the vertical.

The invention has been developed primarily in relation to a particular problem which exists in friction welding machines, and to which reference is hereinafter made. As applied to friction welding machines (hereinafter referred to as friction welding machines of the kind specified) the holder means are adapted for supporting the workpieces to be welded together with the workpieces in contact, one with the other at respective contact faces and the machine further includes means for moving one of the holder means relative to the other in a manner to produce relative motion between the contact faces whilst maintaining contact between them. Such motion is usually rotary motion about said reference axis but it may be orbital motion about said reference axis or possibly in some cases reciprocatory motion.

It will be understood that notwithstanding its development primarily in relation to friction welding machines of the kind specified, the invention may advantageously be applied to other types of machine wherein similar or analogous problems arise, these being concerned with the elimination or minimization of the effects of bending in the bed of the machine. Further examples of machines to which the invention is applicable are: die casting machines wherein the parts concerned are die parts which are required to be maintained in pressure contact with each other over their parting faces; pressing, stamping and forging machines wherein the parts concerned are dies or tools between which a workpiece which may be either cold or hot is disposed; and impact extrusion machines.

Referring now specifically to the problems encountered in known forms of friction welding machine of the kind specified, one of these problems is that when pressure applying means is operated to produce contact under axial pressure between the workpieces, a bending load is transmitted from the holder means to the bed of the body structure. Ordinarily the process of friction welding involves an initial stage of relatively light axial pressure between the workpieces to smooth or remove high spots and irregularities on the contacting faces whilst these are subjected to relative rotation, followed by a second stage, known generally as the burn-off stage, in which the axial contact pressure is increased to raise the temperature at the contact faces of the workpieces to a value at which welding can take place, and finally a third stage, known generally as the forging stage, at which the axial pressure is still further increased and relative motion between the contact faces is stopped to cause the workpieces to become united and a welded junction formed between them.

The axial load which is transmitted as a bending load to the bed of the body structure during the third or forging stage is of sufficient magnitude to produce significant misalignment of the workpieces, especially in friction welding machines intended for use with large workpieces or materials which require high forging loads, for example upwardly of 50 tons.

In a case where the contact faces are plane faces and the relative motion is a rotation about an axis perpendicular to the faces, misalignment is usually measured by the amount of the eccentricity between the axes of the respective workpieces in the plane of the welded junction and acceptible tolerances range from 0.005 inches for workpieces of a diameter and material requiring forging loads up to 12 tons, to 0.010 inches for workpieces of a diameter and material requiring forging loads in the region of a hundred tons.

One expedient which has been adopted to overcome or minimize this disadvantage is to provide a tie member above the level of the axis about which relative rotation takes place, such tie member serving to connect the parts of the body structure which bear the axial loads from the respective holder means, these parts ordinarily being upstanding portions at opposite ends of the bed integrally or otherwise secured to the latter.

Whilst this expedient is effective for its intended purpose, it does introduce difficulties or limitations in obtaining access to the welding station, that is to say the region between the holder means for supporting the respective workpieces, and in particular makes it impossible or difficult to establish a rectilinear feed path extending through the welding station from front to rear of the machine. Elevator means are necessary to feed completed workpieces over the tie member after removal from the welding station.

SUMMARY OF THE INVENTION

It is an object of the present invention to provide a machine of the kind specified having an improved form of body structure which will overcome or reduce the problem of mis-alignment without encountering the disadvantages associated with the restriction of access to and from the working station.

According to the invention we provide a machine of the kind specified wherein the body temperature comprises a member additional to the bed which is off-set from the axis in the same general direction as the bed, and connected in force-transmitting relation with both the pressure-applying means, which is connected with one of the holder means, and a further one of the holder means for relieving the bed of a bending load to which the body structure is subjected by operation of the pressure-applying means to establish contact pressure between the parts supported by the holder means.

Figure 1:
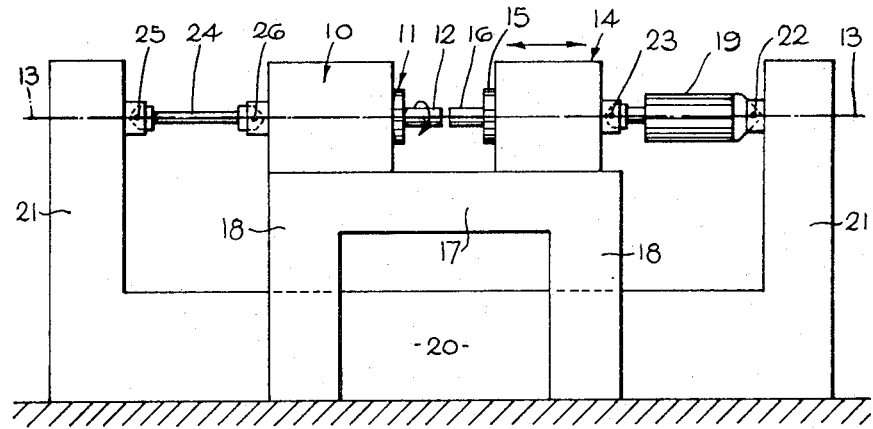
FIG. 1 is a schematic representation in side elevation of a first embodiment of friction welding machine in accordance with the invention.

Referring firstly to FIG. 1, the machine which constitutes the first embodiment comprises a driving head 10 which includes a drive motor operatively connected between the stationary housing of the head and a movable holder 11 which may be in the form of a chuck for supporting a workpiece 12 for rotation about an axis 13.

The machine further comprises a sliding head 14 incorporating a holder 15 fixed relative to the housing of the sliding head for supporting a second workpiece 16 coaxially with the workpiece 12 and non-rotatably.

The driving head 10 and sliding head 14 are mounted on and located by a body structure which comprises a bed member 17. The upper face of the bed member incorporates a longitudinal slideway, for example dove-tailed form, along which a slide of complementary form provided at the lower end of the sliding head can be moved to move the sliding head longitudinally of the bed. The driving head is preferably rigidly mounted on the bed member 17 at one end thereof, but the driving head may also be mounted for sliding movement longitudinally of the bed member, if required.

The bed member 17 is supported at an elevated position by any suitable leg structure such as that indicated by the reference numeral 18 at opposite ends of the bed member.

During the course of operation of the machine the sliding head 14 is moved along the bed member 17 towards the driving head 10 to bring adjacent end faces (herein called the contact faces) of the workpieces 12 and 16 into contact with each other. The holder 11 is moved by the drive motor relative to the holder 15 in a plane which is perpendicular to the axis 13, thus producing rubbing contact of the contact faces of the workpieces. The motion imparted to the holder 11 by the drive motor may by rotation about the axis 13, oscillation, reciprocation or motion along a path which forms a lissajous figure, if the contact faces are plane.

The machine further comprises pressure-applying means to effect axial movement of the sliding head 14 and to establish the requisite pressure between the contact faces of the workpieces. The pressure-applying means comprises an hydraulic piston and cylinder assembly 19, the piston of which is articulately connected to the sliding head 14 for relative pivoting movement about a horizontal axis 23.

The cylinder of the assembly 19 is pivotally connected about a horizontal axis 22 to a transverse element 21 of the body structure. The transverse element is integral with or rigidly secured to one end of an elongate member 20 which extends parallel to the axis 13 and is off-set therefrom in the same direction as the bed 17. A further transverse element 21 is integral with or rigidly connected to the other end of the member 20, and the upper end of this transverse element is connected by a strut member 24 with the drive head 10. The connection between the strut member and the transverse element permits of articulation about a horizontal axis 25, and the connection between the strut member and the drive head permits of articulation about a horizontal axis 26.

Conveniently the member 20 extends directly beneath the axis 13 and through openings provided in each of the leg structures 18. Alternatively, the member 20 may be of substantially rectangular form as viewed in plan and extend around the bed 17 or leg structures 18, rather than through the latter. With either of these constructions the bed and member 20 are off-set in the same general direction from the axis 13 and therefore do not obstruct access to the working station at which the workpieces 12 and 16 are supported.

The member 20 is connected by the transverse elements 21 and strut member 24 in force transmitting relation with the piston and cylinder assembly 19 and with the drive head 10. Accordingly, the reaction of the force which is applied to the sliding head 14 by the piston and cylinder assembly is transmitted through the member 20 to the driving head 10. Operation of the piston and cylinder assembly 19 produces a tensile load in the member 20 and since the latter is off-set from the axis 13 and axially directed forces are exerted in outward directions on both the transverse elements 21 where these are intersected by the axis 13, the member 20 will also be subjected to a bending load. This bending load will cause bending deflection of the member 20 in a vertical plane containing the axis 13.

However, such bending deflection of the member 20 will not be transmitted to the bed member 17 since the member 20 passes through the openings of the leg structures 18 either with clearance, or in sliding engagement with inner faces of the leg structures thereby providing location in a direction at right-angles to the vertical plane in which the member 20 can deflect.

The articulated joints at either end of the strut member 14 and of the piston and cylinder assembly 19 ensure that any deflection of the transverse elements 21 as a result of bending deflection of the member 20 (which would cause the transverse elements to be slightly divergent in an upward direction with respect to each other) will not be transmitted to the sliding and driving heads and will not be transmitted thence to the bed member 17.

The bed member 17 is not in force transmitting relation with the piston and cylinder assembly 19 and the driving head 10, so far as forces generated by operation of the piston and cylinder assembly are concerned. Accordingly operation of the latter does not produce any stress in the bed member 17, notwithstanding that a bending load is applied to the body structure of the machine upon operation of the piston and cylinder assembly. It will be apparent that the member 20 relieves the bed member 17 of this bending load.

Figure 2:
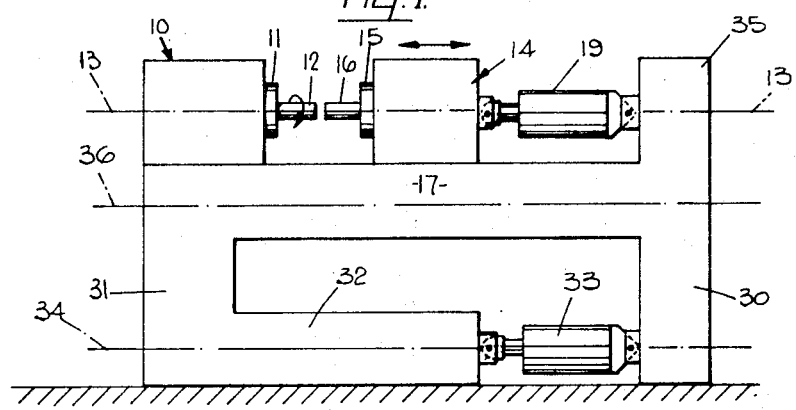
FIG. 2 is a schematic representation similar to FIG. 1 illustrating a second embodiment.

In FIG. 2 parts corresponding to those already described are designated by like reference numerals and the preceding description is to be deemed to apply.

In this embodiment the body structure of the machine includes transverse elements 30 and 31 for supporting the bed member 17 at an elevated position above the floor. The transverse member 31 is integral with or rigidly connected with a horizontal element 32 which extends from the lower end of the transverse element 31 towards the lower end of the transverse element 30. A member in the form of an hydraulic piston and cylinder assembly 33 is interposed between the lower end of the transverse element 30 and the horizontal element 32. The piston and cylinder element 33 is supplied with hydraulic fluid from a source of pressure fluid through an hydraulic supply system designed to ensure that the pressure applied to the piston and cylinder assembly 33 varies in the same way as that applied to the piston and cylinder assembly 19. Accordingly, corresponding outward axial thrusts are developed along the axis 13 and along an axis 34 which extends parallel to the axis 13 through the assembly 33, and the latter is operative to relieve the bed member 17 of the bending load which is applied to the body structure upon operation of the piston and cylinder assembly 19.

In the absence of the piston and cylinder assembly 33 bending of the bed member 17 would take place as a result of axial thrust exerted along the axis 13 and transmitted to the bed member 17 through the transverse element 35 and through the driving head 10, the latter being rigidly secured to the bed member at one end thereof. If bending deflection of the bed member would take place, a neutral axis 36 would exist above which parts of the bed member would be in tension and below which parts would be in compression.

The relative thrusts produced by the piston and cylinder assembly 19 and the piston and cylinder assembly 33, and the distance of the latter below the neutral axis 36, is selected to provide equal bending moments in a vertical plane due to these piston and cylinder assemblies respectively about a horizontal axis intersecting the neutral axis 36 at right-angles thereto.

The respective distances between the piston and cylinder assemblies 19 and 33 and the neutral axis 36, and the respective piston areas of these assemblies may be so selected that equal fluid pressure in the piston and cylinder assemblies results in complete relief of the bed member 17 from bending load.

It will be noted that the bed member 17 and the piston and cylinder element 33 are off-set from the axis 13 on the same side thereof and accordingly these members do not obstruct access to the working station.

In the second embodiment both the bed member 17 and the piston and cylinder assembly 33 are connected in force transmitting relation with the piston and cylinder assembly 19 and the driving head 10. It will be noted that the bed member, which is nearer to the axis 13 than is the piston and cylinder assembly 33, is stressed in tension upon operation of the piston and cylinder assembly 19; whereas the piston and cylinder assembly 33 is subjected to compressive loading upon operation of the assembly 33.

Figure 3:
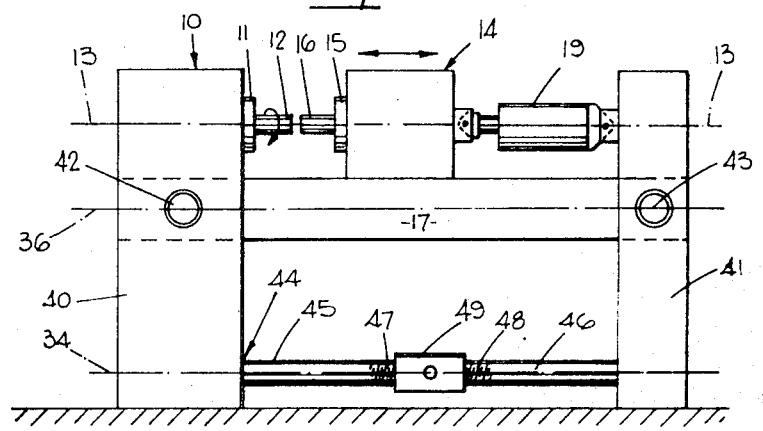
FIG. 3 is a schematic representation similar to FIG. 1 and illustrating a third embodiment.

Referring now to FIG. 3, parts corresponding to those previously described with reference to the first embodiment are designated by like reference numerals and the preceding description is deemed to apply.

In the third embodiment the body structure comprises a bed member 17, transverse elements 40 and 41 positioned at opposite ends thereof, and a further elongate member 44.

The bed member is pivotally connected at each of its ends with two respective mid-portions of the transverse elements 40 and 41 by means of pivot pins 42 and 43 respectively. These pivot pins permit relative pivoting movement of the bed and transverse elements in a vertical plane which contains the axis 13.

Respective upper end portions of the transverse elements 40 and 41 project upwardly from the bed member 17 to the region of the axis 13, the upper end portion of the element 40 being constituted by the driving head 10 and the upper end portion of the element 41 being pivotally connected with the piston and cylinder assembly 19.

The elongate member 44 is interposed between respective lower end portions of the transverse elements 40 and 41, the member 44 extending parallel to and directly below the axis 13. The member 44 may be of fixed length, but as shown, preferably it is of adjustable length comprising separate portions 45 and 46 having screw threads 47 and 48 of opposite hands connected by a nut 49 to form a turn-buckle mechanism for lengthening and shortening the member.

The transverse elements 40 and 41 connect the bed member 17 and elongate member 44 in force transmitting relation with each other and with the driving head 10 and the piston and cylinder assembly 19. When the latter assembly is operated, the bed member, which is nearer to the axis 13 than is the elongate member 44, is stressed in tension; whereas the elongate member 44 is stressed compressively. The nut 49 is positioned or adjusted to apply an outwardly directed force to the lower end portions of the transverse member 40 and 41 which is sufficient to relieve the bed member 17 of the bending load which is applied to the body structure upon operation of the piston and cylinder assembly 19. It will be appreciated that for a given setting of the nut 49, some deflection of the transverse element 40 and driving head 10 relative to the bed member 17 and sliding head 14 will occur if the thrust exerted by the piston and cylinder assembly 19 falls outside a predetermined range appropriate to the setting of the nut. In friction welding correct alignment of the workpieces is more critical during the final or forging stage of the operation than during earlier stages. Accordingly, the nut 49 can be adjusted according to the thrust exerted by the piston and cylinder element 19 during the forging stage for any particular type of work.

Relative deflection of the driving head 10 and bed member 17 may be avoided by replacing the pivot pin 42 with a rigid joint between the bed member 17 and the transverse element 40. In this case any imbalance of the thrust produced by the piston and cylinder assembly 19 and the thrust exerted by the elongate member 44 would produce deflection of the transverse element 41 only relative to the bed member 17. Alternatively, both the driving head 10 and the sliding head 14 may be mounted on the bed member 17, as described with reference to the first embodiment. In this case a strut member would be provided between the driving head 10 and an upper end portion of the transverse element 44, the latter being pivotally connected with the bed member so that deflection of the transverse elements would not produce deflection of the bed member.

It will be noted that the elongate member 44 and the bed member 17 are off-set from the axis 13 to the same side thereof and therefore do not obstruct access to the working station.

Figure 4:
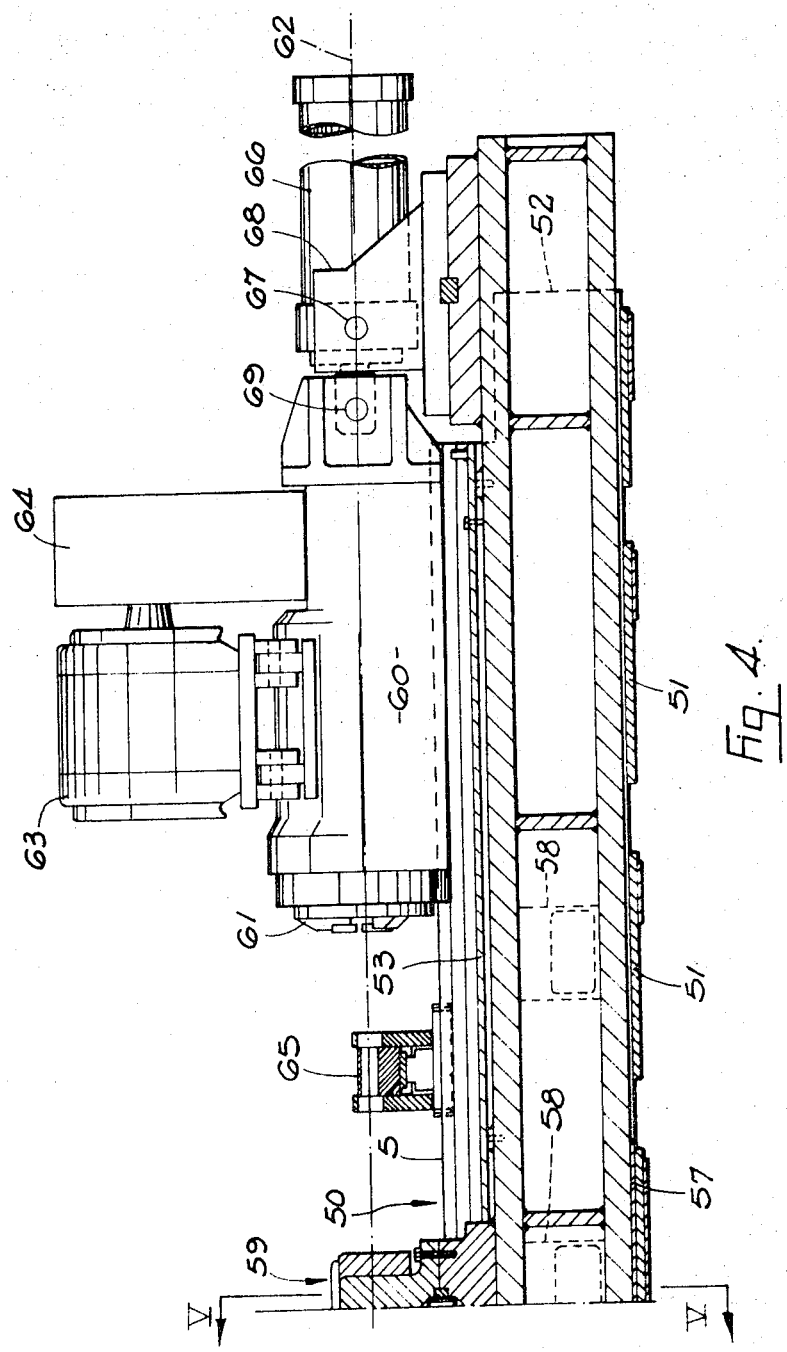
FIG. 4 is a view in side elevation and partly in longitudinal cross-section of a fourth embodiment of friction welding machine in accordance with the invention, and V — 5 is a view in cross-section on the line V— V of FIG. 4 showing the inner and outer parts (only) of the body structure of the machine, the holder means and pressure-applying means being omitted.
Figure 5:
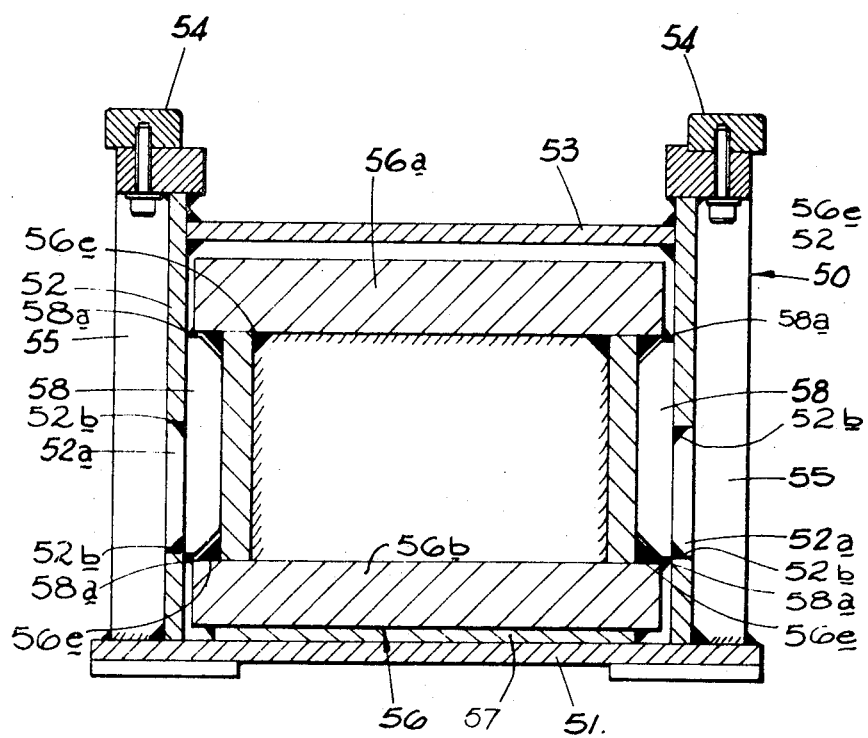

The fourth embodiment of the invention which is illustrated in FIGS. 4 and 5 is similar to the first embodiment in that the bed member of each of these embodiments is not in force transmitting relation with the pressure applying means so that thrust produced upon operation of the pressure applying means does not tend to deflect the bed member.

The machine illustrated in FIGS. 4 and 5 is double ended, the two ends being of similar construction, and therefore only one end of the machine is shown in FIG. 4 and described herein.

The body structure of the machine includes a bed member 50 of generally box section having a base plate 51, side plates 52 and a top plate 53. The box section formed by these plates is open-ended. A slideway is formed on the bed member by rails 54 mounted on the upper edge of the side plates 52 and additionally supported on uprights 55.

The body structure further comprises a box section beam member 56 which is formed separately from the bed member 50 and is disposed within the latter. The beam 56 has a length greater than that of the bed member and projects beyond the latter at each end of the machine. The beam 56 is supported at a position mid-way between its ends on a plate 56 which rests on the base plate 51. The beam is located laterally by six spacer elements 58, three of which are disposed in each side of the beam and which engage the inner face of the respective one of the side plates 52.

One pair of the six spacer elements is positioned midway between the ends of the beam 56. This pair of spacer elements, as seen more particularly in FIG. 5, is used as the intermediary to secure the beam 56 to the side plates of the box section bed member 50.

For this purpose the two spacer elements 58 are welded as indicated in 58a along their upper and lower margins to the top and bottom plates 56a, 56b of the beam member 56, the plates 58 being cut away to provide clearance with respect to the welding fillets 56e by which the side plates 56c and 56d are united externally to the top and bottom plates.

The side plates 52 of the bed member have apertures 52a giving access to the spacer elements 58, the latter being welded to the side plates around the edges of these apertures as indicated by the welding fillets 52b.

The remaining spacer element are not welded to the side plates 52 but provide lateral location with freedom to permit of deflection of the beam member 56 in a vertical plane under a bending load without transmitting bending stress to the bed member 50.

Stop means in the form of a block 59 is rigidly mounted on the upper face of the beam 56 at a central position thereon, the block extending through an aperture in the top plate 53 of the bed member to a level above the slideway rails 54. A driving head 60 is mounted on the slideway of the bed member adjacent one end thereof and for movement longitudinally thereof. The driving head includes a rotatable chuck 61 for holding a first workpiece and for rotating same about a longitudinal axis 62 of the machine. The driving head also carries an electric motor 63 for driving the chuck through a gearbox 64.

A similar driving head is mounted on the bed member adjacent the other end thereof.

A pair of central holder means is mounted on the bed member, one between each of the driving heads and the block 59. Each of the central holder means is in the form of a self-centering clamp 65 for supporting a second workpiece in alignment with the first workpiece and is mounted on the slideway of the bed member. The clamp 65 is arranged to grip the second workpiece so as to prevent rotation thereof.

A pressure applying means is provided in association with each of the driving heads 60 for moving same along the bed member towards the adjacent clamp 65 so as to bring the first and second workpieces into pressure contact with each other, and for controlling the amount of pressure exerted by one workpiece on the other. Each of the pressure-applying means comprises an hydraulically operated ram 66, the piston of which is connected with the driving head 60 by means of a pivot pin 69. The cylinder of the pressure-applying ram 66 is pivotally mounted at 67 on a transverse member in the form of a bracket 68 which in turn is rigidly mounted on an end portion of the beam 56 which projects beyond the bed member 50. The bracket 68 extends upwardly from the beam 66 to the region of the axis 62, the center of the pivot pin 67 lying on this axis.

The second workpiece, which is supported by the clamp 65, is arranged so that an end face remote from the first workpiece abuts the block 59 so that the latter prevents displacement of the second workpiece as the ram 66 is pressurized.

When the ram 66 is operated to increase the contact pressure between the workpieces, the reaction of the axially directed force applied to the driving head 60 is transmitted through the bracket 68, the beam 56 and the block 59 to the second workpiece. Since the beam 56 is off-set from the axis 62, a bending load is applied to the beam by the block 59 and the bracket 68. However, any deflection of the beam which occurs as a result of this bending load will not cause deflection of the bed member 50 since the end portion of the beam 56 is free to move relative to the bed member in a vertical plane which contains the axis 62.

Also, the pivotal connections 67 and 69 permit bending deflection of the beam in a vertical plane without deflection of the bed member 50 or of the driving head 60.

Since the beam member 56 is disposed below the slideway of the bed member 50, and below the axis 62 about which relative rotation of the workpieces occurs, the beam 56 does not interfere with the feeding of workpieces to the chuck 61 and clamp 65.

When two similar welding operations are carried out simultaneously, one at either end of the machine, the force exerted by the two workpieces which engage the block 59 on opposite ends there will balance one another. Thus, in this case the block 59 need not be mounted on the beam 56 sufficiently securely to withstand the total force exerted by the ram 66 on the driving head 60. Furthermore, if the block 59 where omitted or removed from the machine, the machine could be used to weld simultaneously two workpieces held in respective ones of the chucks 61 to respective ends of a further workpiece held in the clamps 56.

It will be understood that although FIG. 4 illustrates on half of a "double-ended" friction welding machine having holder means in the form of a rotatable driving head incorporating a motor at each end of the bed and a rotationally stationary holder means in the form of the clamp 65 at an intermediate (central) position along the bed member, the construction illustrated in FIG. 4 may be applied to a single-ended machine, if desired. In this case one of the holder means at the end of the bed would be replaced by a clamp similar to the clamp 65. In the double-ended type of machine illustrated it would, of course, be possible to use a rotationally stationary holder means at each end of the bed, and the holder means disposed at an intermediate, for example central, position along the bed would incorporate either one or two independently rotatable chucks according to whether a three-part structure was required to be formed by friction welding, or two two-part structures.

We claim:

1. In a machine comprising:
   a. a body structure including a bed member,
   b. a plurality of holder means mounted on the bed member for supporting at a working station parts which in the course of operation of the machine are required to be brought into contact under pressure exerted along an axis off-set from the bed member and passing through contacting faces of said parts,
   c. pressure-applying means for urging at least one of the holder means relative to another of the holder means in a direction along the axis, at least one component of the body structure being stressed when the pressure-applying means is operated to establish contact pressure between said parts when supported by the holder means,
   the improvement wherein:
   a. the bed member is in the form of an elongate hollow beam,
   b. the body structure comprises a further member in the form of a further elongate beam which extends through the interior of the bed member,
   c. end portions of said further beam project from opposite ends of the bed member,
   d. transverse elements on said end portions extend from said further beam to the region of said axis and are connected respectively to the pressure-applying means and said other holder means, whereby application of a bending load to the bed member when the body structure is stressed by operation of the pressure-applying means is avoided.

2. The improvement according to claim 1 wherein:
   a. the machine is a friction welding machine,
   b. said one holder means is positioned adjacent one end of the bed member,
   c. said further holder means is positioned adjacent an opposite end of the bed member,
   d. further pressure-applying means is provided for urging said further holder means along the axis,
   e. respective drive motors are provided for rotating each of said one and said further holder means about the axis,
   f. stop means is rigidly mounted on the further beam between the end portions thereof and extending therefrom through an aperture in the bed member to the region of the axis,
   g. a pair of central holder means is mounted non-rotatably on the bed member, one between said one holder means and the stop means and the other between said further holder means and the stop means, whereby movement of respective workpieces supported in the central holder means along the axis towards the center of the bed member can be restrained by said stop means and workpieces supported in said one and said further holder means respectively can be forced into pressure contact with adjacent ones of the first-mentioned workpieces by operation of the pressure-applying means.

3. In a machine comprising:
   a. a body structure including a bed member,
   b. a plurality of holder means mounted on the bed member for supporting at a working station parts which in the course of operation of the machine are required to be brought into contact under pressure exerted along an axis off-set from the bed member and passing through contacting faces of said parts,
   c. pressure-applying means for urging at least one of the holder means relative to another of the holder means in a direction along the axis, at least one component of the body structure being stressed when the pressure-applying means is operated to establish contact pressure between said parts when supported by the holder means,
   the improvement wherein:
   a. the body structure comprises further member which is off-set from said axis in the same general direction as said bed member by a distance different from the distance between the axis and the bed member,
   b. the one of said members nearer said axis is so connected in force-transmitting relation with both the pressure-applying means and said one of said holder means as to be stressed in tension when the pressure-applying means is operated, and
   c. the other of said members, being further from said axis, is so connected with said one member as to be stressed compressively when the pressure-applying means is operated.

4. The improvement according to claim 3 wherein:
   a. the body structure further includes transverse elements spaced apart longitudinally of the bed member and extending transversely of the length of the bed member,
   b. the bed member is pivotally connected to respective mid-portions of the transverse elements for relative pivoting movement in a plane containing said axis,
   c. a first end portion of each transverse element is disposed in the region of said axis, d. said holder means are interposed between the respective first end portions of the transverse elements, e. a second end portion of each transverse element projects to the side of the bed member remote from the axis, f. said further member is interposed between the respective second end portions of the transverse elements.

5. The improvement according to claim 3 wherein:

a. the body structure further includes transverse elements which project from the bed member at positions spaced therealong and in a direction away from said axis.

b. the bed member is rigid with the transverse elements.

c. said further member is connected with respective end portions of the transverse elements remote from the bed member and said axis, d. said further member is stressed in compression at least when the pressure-applying means is operated, whereby the bed member is relieved of the bending load applied to the body structure by operation of the pressure-applying means.

6. The improvement according to claim 5 wherein means is provided for adjusting, in accordance with the force exerted by said pressure-applying means, the compressive stress which exists in said further member at least when the pressure applying means is operated.

7. The improvement according to claim 6 wherein:

a. said means for adjusting the compressive stress comprises first hydraulic piston and cylinder means, b. said pressure-applying means comprises second hydraulic piston and cylinder means, c. means is provided for so controlling the respective hydraulic pressures in the first and second hydraulic piston and cylinder means that no significant bending load is applied to the bed member.

8. In a machine comprising:

a. a body structure including a bed member, b. a plurality of holder means mounted on the bed member for holding at a working station parts which in the course of operation of the machine are required to be brought into contact under pressure exerted along an horizontal axis passing through the contact faces of said parts, c. pressure-applying means for urging at least one of the holder means relative to another of the holder means in a direction along the axis, and wherein, d. the bed member presents an horizontal support surface on which said one holder means is movably supported, the improvement wherein the body structure comprises a further member, a first part of which lies beneath said support surface of the bed member, and further parts of which project above the level of said support surface and are connected in force-transmitting relation with the pressure-applying means and holder means whereby the load produced in the body structure by operation of the pressure-applying means is borne by said further member but not by the bed member.

9. The improvement according to claim 8 wherein locating means is provided for preventing displacement of said first part of said further member relative to the bed member in directions transverse to a vertical plane which is parallel to said axis, said locating means being arranged to provide freedom for deflection of said first part relative to the bed member in said plane.

10. The improvement according to claim 9 wherein said first member is secured to the bed member at a single position only along the length of the bed member.

* * * * *